(12) United States Patent
Smith

(10) Patent No.: US 7,237,830 B1
(45) Date of Patent: Jul. 3, 2007

(54) LEAF SPRING TRUCK CAB SUSPENSION

(75) Inventor: Joseph M. Smith, Bluffton, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 0 days.

(21) Appl. No.: 11/384,081

(22) Filed: Mar. 17, 2006

(51) Int. Cl.
*B62D 33/06* (2006.01)

(52) U.S. Cl. .......................... 296/190.07; 296/190.05; 180/89.12

(58) Field of Classification Search ........... 296/190.07, 296/190.05, 190.04, 190.01; 180/89.13, 180/89.12, 89.14, 89.1, 89.19; 280/124.1
See application file for complete search history.

(56) References Cited

U.S. PATENT DOCUMENTS

| | | | |
|---|---|---|---|
| 3,667,565 A | * | 6/1972 | Steiner et al. ............. 180/89.1 |
| 4,989,684 A | | 2/1991 | Conaway |
| 5,209,316 A | | 5/1993 | Bauer |
| 6,408,970 B1 | | 6/2002 | Eng |
| 6,540,038 B2 | | 4/2003 | Taylor et al. |

FOREIGN PATENT DOCUMENTS

WO    WO 93/19973    10/1993

* cited by examiner

*Primary Examiner*—Joseph D. Pape
(74) *Attorney, Agent, or Firm*—Jeffrey P. Calfa; Gerald W. Askew; Susan L. Lukasik

(57) ABSTRACT

A truck cab is supported from the vehicle chassis at six points, two points being at the front corners of the cab, two points (mid-mount) being midway between the front and the back of the cab along the exterior sides and two points being along the rear sill of the cab. The front support points are fitted with conventional rubber mounts supported from chassis frame rails. Left side and right side single leaf springs are attached between one each of the mid-mount support points and the rear sill support points. A single shock absorber may be fitted centered along the longitudinal center line of the vehicle under the rear sill, bracketed by the rear support points.

12 Claims, 5 Drawing Sheets

LEAF SPRING TRUCK CAB SUSPENSION

BACKGROUND OF THE INVENTION

1. Technical Field

The invention relates to secondary suspension systems for trucks and, more particularly, to a truck cab suspension system providing noise and shock isolation through an inexpensive, compact and simple mechanism.

2. Description of the Problem

The load carried by a truck is supported by a frame which is resiliently carried by suspension springs from the truck's axles. The primary axle suspension springs usually have very high spring rates which make the ride jarring to the operator and to structures such as a cab supported by the frame. It is desirable to isolate vehicle cabs and their occupants from shock and vibration. Doing so enhances cab occupant comfort and extends the service life of the cab by reducing stress to the cab. Stress promotes structural damage, particularly to spot welds used in assembly of the cab structure.

To dampen the vibration and shock transmitted to the cab, secondary suspension systems have been employed utilizing conventional suspension components such as air springs to isolate the cab structure from shock and shock absorbers to dampen motion of the cab, respectively. A wide variety of cab suspensions exists in the art. A typical configuration includes hard rubber mounts at the front end of the cab and a combination of an air spring and shock absorbers installed along a rear sill of the cab. The front mounting elements are required to absorb longitudinal loads transmitted between cab and frame. The rear suspension elements provide shock isolation and damping of vertical motion. Frequently the cab structure in the cab floor area and the front mount area is beefed up to take the stress. Rear impact plates to take the stress of the suspension elements are also known. Frame beaming contributes considerable vertical loading into the cab when rubber mounts for the cab are placed on beaming anti-nodes. The anti-node in many heavy truck applications is at the back of cab location.

SUMMARY OF THE INVENTION

According to the invention there is provided a cab suspension system using a pair of leaf springs each connected at one end to the rear sill of the cab and at the other end by shackle boxes to mid mount locations along the outside edges of the cab. Spring eye attachments of the leaf springs at the rear sill and shackle box mountings of the springs to the forward mid mount support locations share longitudinal loading on the suspension. The leaf springs are attached to the chassis frame rails between the ends of the leaf springs. The leaf springs are canted or angled with respect to the frame rails. A conventional shock absorber is located along the vehicle centerline and mounted between a chassis cross member and the cab to dampen vertical motion. Hard rubber mounts at the forward corners of the cab complete the cab mounting. The spring configuration is similar to that used for truck steering axle suspensions except for the orientation of the leaf springs, which angles inwardly toward the truck longitudinal centerline from front to rear. The suspension provides inexpensive and compact six point support of the cab from the chassis.

Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
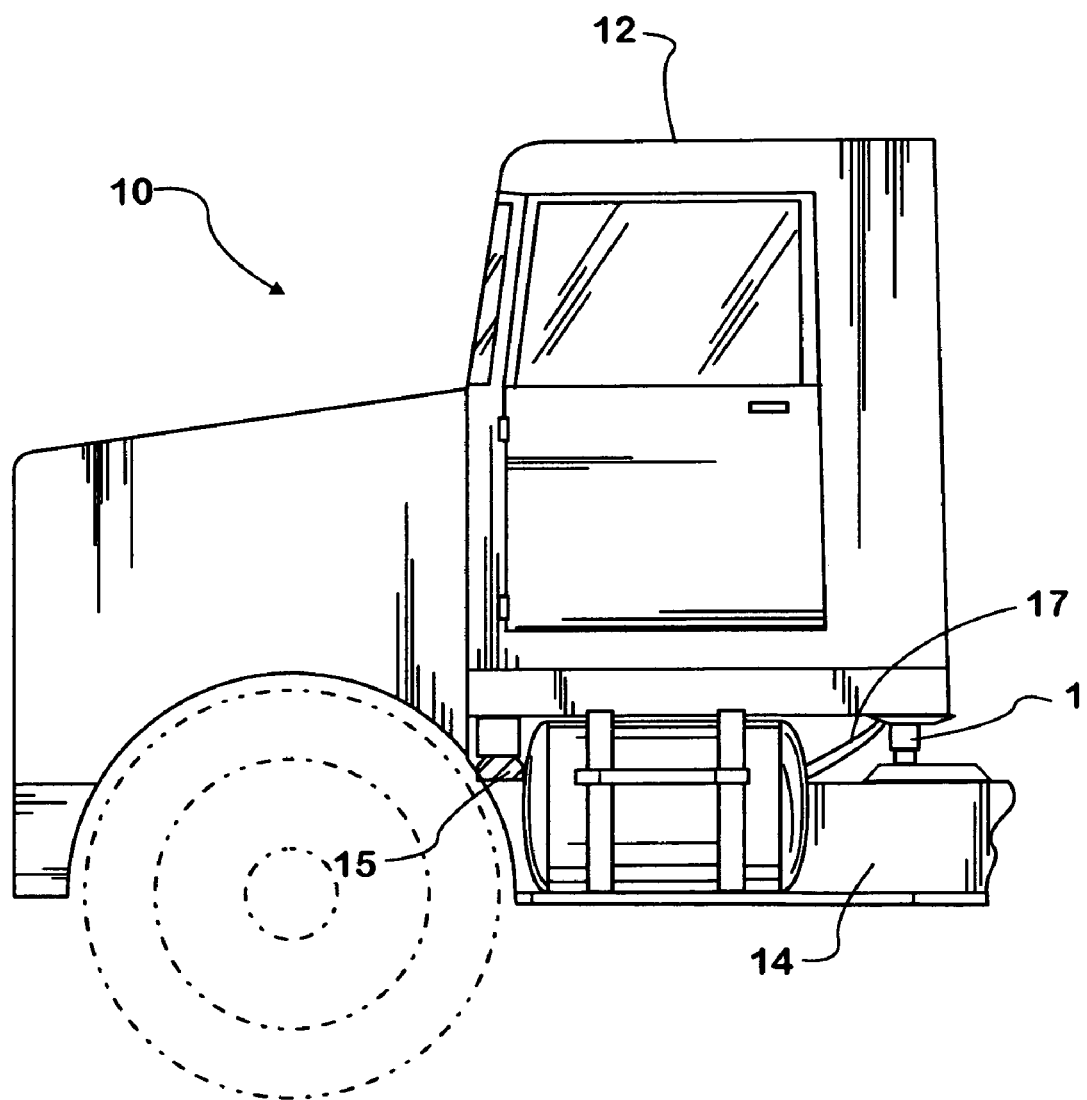
FIG. 1 is a side elevation view of a truck cab suspended in accordance with a first embodiment of the invention.

Referring now to the figures and in particular to FIG. 1, a truck 10 includes a truck cab 12 disposed on a truck chassis. Truck chassis 14 comprises two longitudinal frame rails 16 and 18 (see FIG. 2) running the lengths of the left side (L) and the right side (R) of a truck or tractor unit. Truck cab 12 is supported from the side frame rails at six points of support on the underside of the cab. The six support points include two forward points of support generally toward the front corners of cab 12. A hard mount 15 is located at one such point. Leaf springs, including left side leaf spring 17, connect latitudinally spaced mid cab support points to each of a pair of rear cab support points mutually spaced from one another along the rear sill of the cab. A shock absorber 19 fitted between the rear sill of the cab 12 and chassis 14 completes the suspension system.

Figure 2:
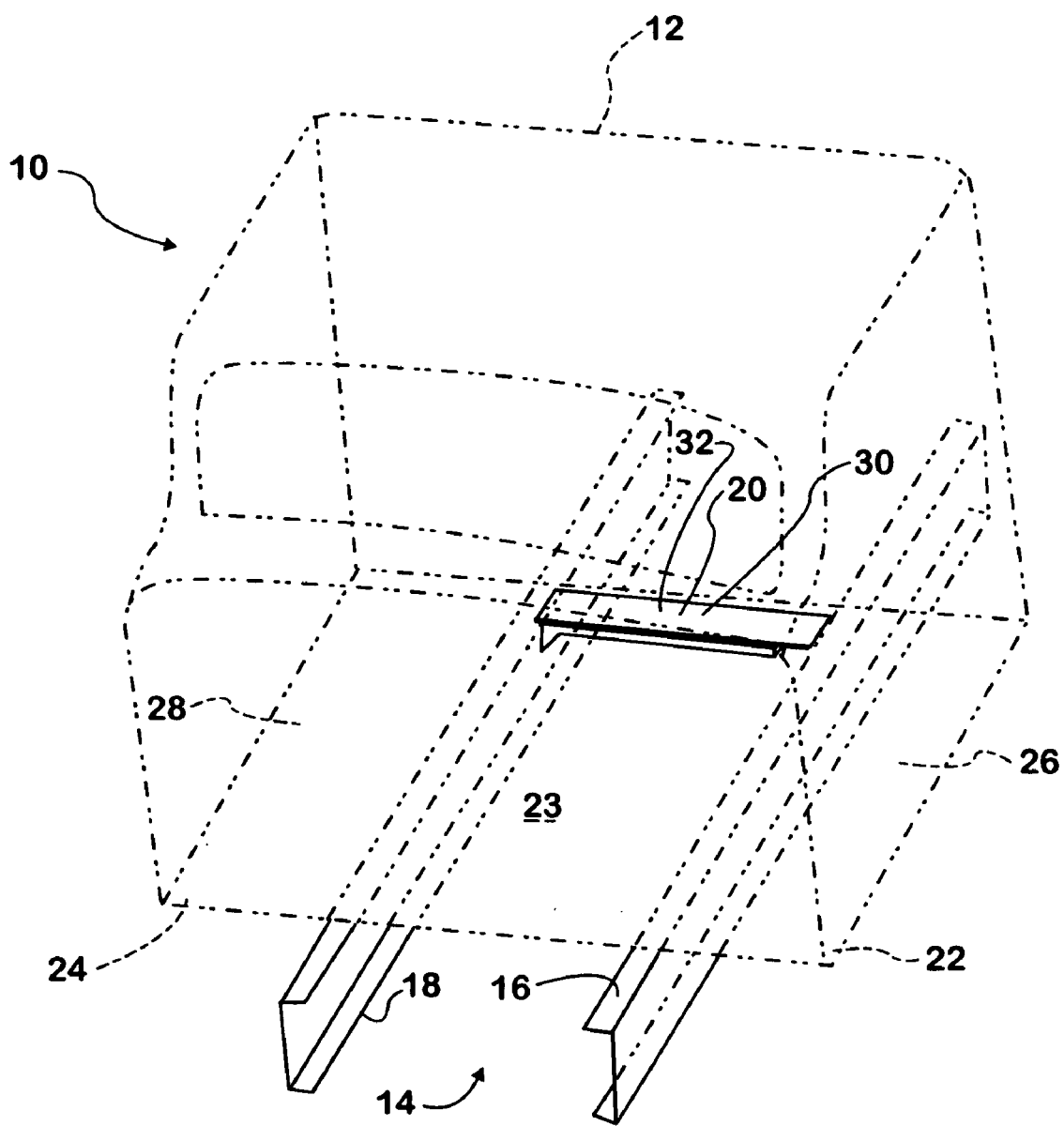
FIG. 2 is a perspective view of a truck cab as oriented with respect to the chassis frame rails from which it is suspended.

Referring to FIG. 2, the locations of six support points 22, 24, 26, 28, 30 and 32 located on the underside 23 of a truck cab 12 are illustrated. Support points 22, 24 are located at the front corners of the cab 12. Mid cab support points 26, 28 are located along the outside edges of the cab midway between the front and back of the cab 12. Two rear support points 30, 32 are located toward the center of a cab rear sill over a chassis cross member 20. The cab 12 is disposed over left and right frame rails 16, 18 from which it is supported.

Figure 3A:
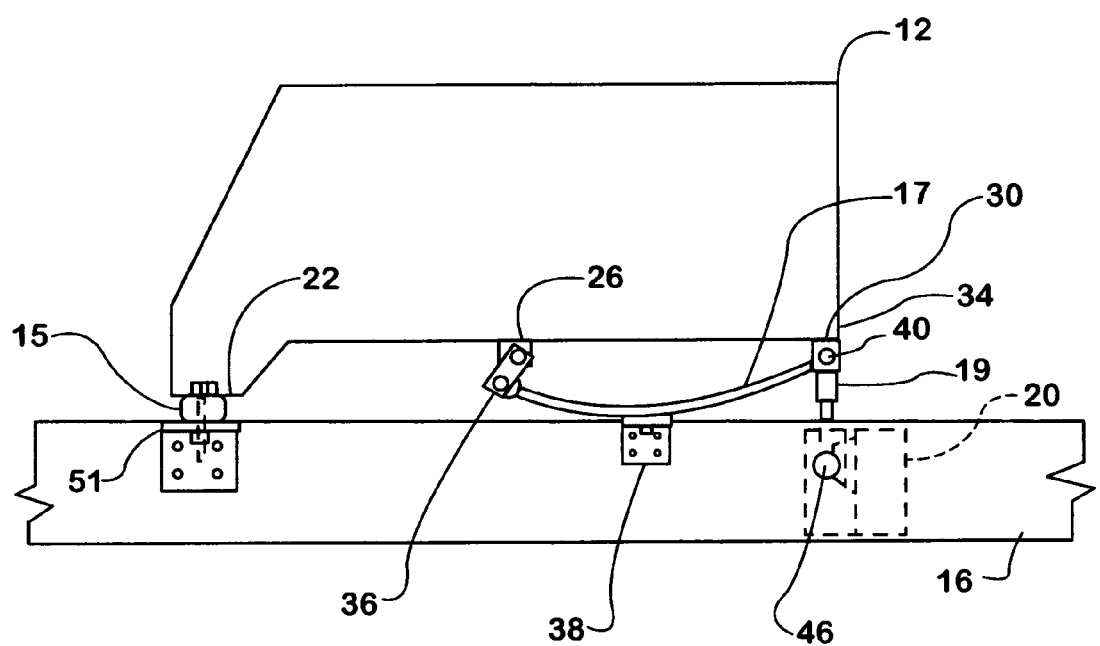
FIGS. 3A-B are side elevations of the cab suspension system in accord with a preferred and alternative embodiments of the invention.

Referring to FIG. 3A, one side of the suspension system of the invention is shown including a hard rubber forward mount 15, a leaf spring 17 and shock absorber 19. Leaf spring 17 is illustrated as a single leaf, which is preferred, though additional leaves can be used. Hard rubber forward mount 15 installed between an impact plate 51 extending outwardly from left side frame rail 16 and forward cab support point 22. Leaf spring 17 is installed in a fashion comparable to that used with a front steering axle on a truck. Leaf spring 17 is installed at its forward in a shackle box 36 hanging from midcab support point 26. Shackle box 36 is installed to orient leaf spring 17 back at an angle to a rear support point 30 where the leaf spring is connected at its opposite end by a conventional pivoting (spring eye) attachment 40 to the underside of the cab 12. The leaf spring is attached near its midpoint by a frame hanger 38 to left side frame rail 16. Shock absorber 19 is mounted between rear sill 34 and cross member 20 of the chassis 14. A pivot attachment mount 46 is provided on beam 20 for connection of the lower end of shock absorber 19 to the beam.

Figure 3B:
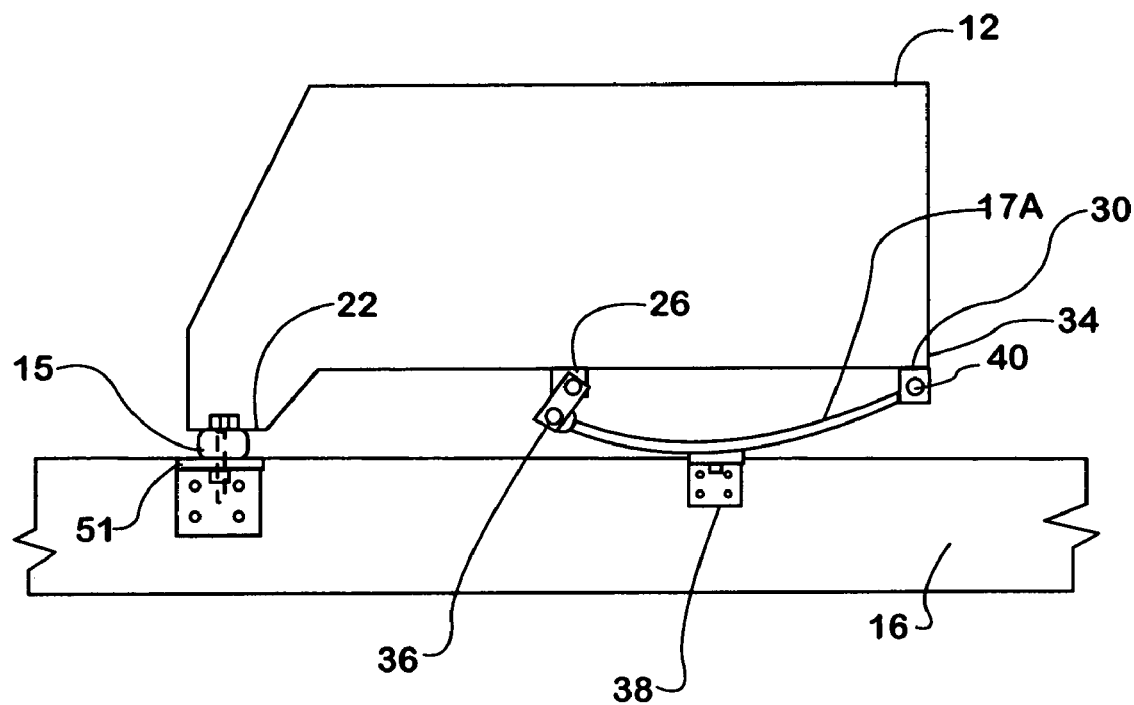

Referring to FIG. 3B, single leaf spring 17 has been replaced by a leaf pack assembly 17A having multiple, thin section leaves. Relying on interleaf friction to dampen oscillation, no shock absorber 19 is shown at the rear of cab 12.

Figure 4:
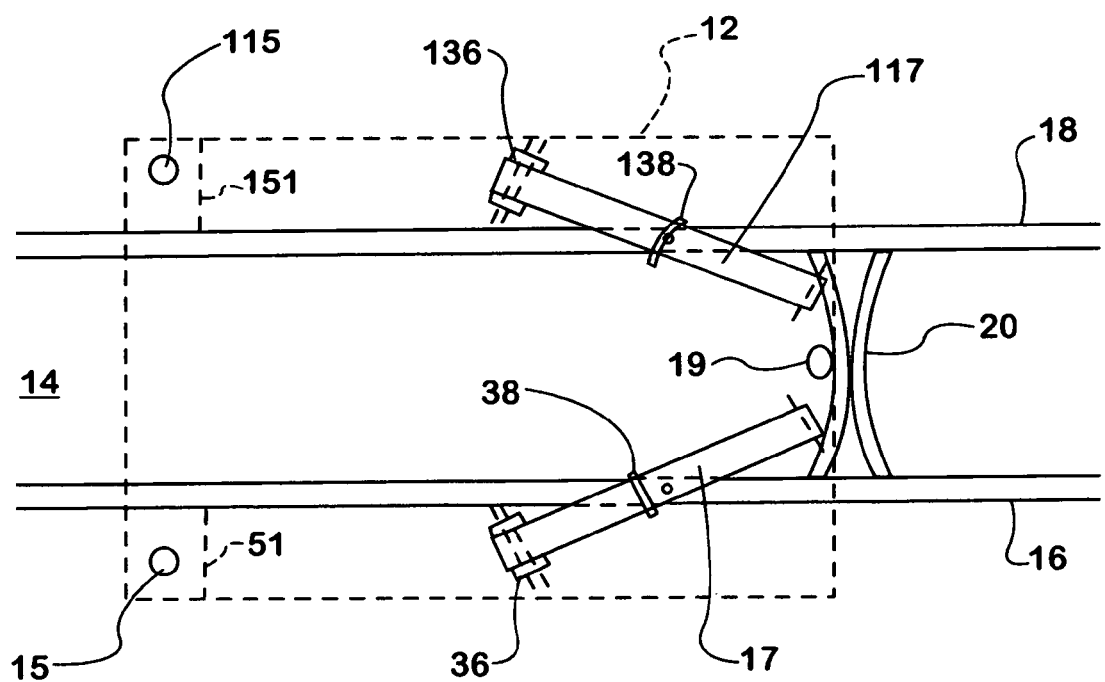
FIG. 4 is a top plan view of the cab suspension system in accord with the preferred embodiment of the invention.

Referring to FIG. 4, the interrelationship of suspension system components may be better understood. Hard rubber mount 15 is duplicated along the right side of the cab 12 (the outline of which is shown in phantom) by a hard rubber mount 115 installed on top of a impact plate 151. Impact plate 151 extends outwardly (i.e. away from the chassis centerline) from frame rail 18. The angled characteristic of the positioning of leaf springs 17, 117 is clearly seen from the top down perspective of the figure. Angling of the leaf springs 17, 117 helps transfer both longitudinal and lateral loading of the springs. Shackle boxes 36 and 136 are turned to inwardly direct the leaf springs toward the rear of cab 12 so than the trailing ends of the leaf springs are located just to either side of a centered shock absorber 19 under the rear sill of the cab 12. Leaf springs 17 and 117 are attached to left and right frame rails 16, 18, respectively, by frame hangers 38, 138. Shock absorber 19 is mounted to cross member 20 along the longitudinal center line of the chassis 14. The ability of the leaf springs 17, 117 to take bi-axial loading helps stabilize the cab laterally. Thin section, multiple leaf spring designs are similarly angled.

Shock absorber(s), where used, may be positioned variously and achieve the same functionality as is achieved by the illustrated positioning. For example, multiple shocks could be positioned along the center line of the chassis under the cab 12. Alternatively, multiple shocks could be mounted running outwardly in either direction perpendicular to the center line, toward the frame rails 16, 18 on either side of the vehicle, in a balanced arrangement.

The cab suspension system of the present invention is realized using a pair of leaf springs connected at one end to the rear sill of the cab and at the other ends by shackle boxes to mid mount locations along the outside edge of the cab. The spring eye attachments to the rear and the shackle boxes forward for the leaf springs share longitudinal loading on the suspension. A conventional shock absorber located along the vehicle centerline between a chassis cross member and the cab dampens vertical motion. The configuration is similar to that used for truck steering axle suspensions except that the leaf springs are inwardly canted toward the truck longitudinal centerline from front to rear. The suspension provides an inexpensive and compact way of providing six point load distribution and absorption of longitudinal loading without the expense of an air supply system on the vehicle (e.g., compressor, dryer, tanks, lines, etc.).

While the invention is shown in only one of its forms, it is not thus limited but is susceptible to various changes and modifications without departing from the spirit and scope of the invention.

What is claimed is:

1. A suspension system for a cab comprising:
   a chassis including left and right side frame rails running underneath the cab and a cross member between the left and right side frame rails underneath the cab;
   the cab including a rear sill, left and right side front corners and left and right side outside edges running parallel to the left and right side frame rails; and
   left and right side leaf springs each connected at one end to spaced points along the rear sill of the cab and at their respective opposite ends to mid mount locations along left and right side outside edges of the cab such that the left and right side leaf springs are non-parallel to and pass over the left and right side frame rails for attachment thereto.

2. A suspension system for a cab in accord with claim 1, further comprising:
   left and right side frame hangers connecting the left and right side leaf springs to the left and right side frame rails, respectively.

3. A suspension system for a cab in accord with claim 2, further comprising:
   left and right side shackle boxes depending from the mid mount locations and attached to the left and right side leaf springs, respectively.

4. A suspension system for a cab in accord with claim 3, further comprising:
   left and right side rubber mounts at forward corners of the cab supporting the cab at the forward corners from the left and right side frame rails.

5. A suspension system for a cab in accord with claim 4, further comprising:
   a shock absorber installed between the rear sill and the cross member.

6. A suspension system for a cab in accord with claim 5, further comprising:
   the left and right leaf springs being single leaf springs.

7. A suspension system for a cab in accord with claim 4, further comprising:
   the left and right leaf springs being thin section, multiple leaf designs.

8. A truck comprising:
   a cab having a rear sill, left and right outside edges and left and right side front corners;
   a chassis located under and supporting the cab, the chassis having left and right side frame rails;
   left and right side rubber mounts installed between the left and right side frame rails and the left and right side front corners of the cab;
   left and right side shackle boxes depending from mid mount locations along the left and right side outside edges of the cab;
   left and right side leaf springs attached at one end to the left and right side shackle boxes and disposed canted inwardly toward a longitudinal center line of the chassis away from the left and right side front corners; and
   first and second points of attachment for free ends of the left and right side leaf springs to the rear sill.

9. A truck in accord with claim 7, further comprising:
   the chassis having a cross member between the left side and right side frame rails under the rear sill; and
   a shock absorber installed between the cross member and the rear sill.

10. A cab suspension system comprising:
    a motor vehicle chassis having a longitudinal center line;
    six points of support on an underside of the cab;
    rubber mounts between the motor vehicle chassis and each of a first pair of latitudinally spaced points of support on the underside of the cab;
    first and second shackle boxes depending from each of a second pair of latitudinally spaced support points on the underside of the cab; and
    first and second leaf springs attached at one end to the first and second shackle boxes, respectively, and at the opposite free ends to attachment points located at a third pair of support points on the underside of the cab and to the chassis between the opposite ends of the springs.

11. A cab suspension system in accord with claim 10, further comprising:
    a shock absorber connected between the chassis and the underside of the cab.

12. A cab suspension system in accord with claim 11, further comprising the second pair of support points being located along outside edges of the cab approximately midway between a front and a rear of the cab and the third pair of support points being along a rear edge of the cab.

* * * * *